US012595602B2

(12) United States Patent
Zhang et al.

(10) Patent No.: US 12,595,602 B2
(45) Date of Patent: Apr. 7, 2026

(54) METHOD FOR PREPARING ELECTROTHERMAL HEATING SHEET FROM CARBON FIBER BRAIDED FABRIC SCRAPS

(71) Applicant: Zhengzhou University, Zhengzhou (CN)

(72) Inventors: Na Zhang, Zhengzhou (CN); Maolin Zheng, Zhengzhou (CN); Ming Huang, Zhengzhou (CN); Chuntai Liu, Zhengzhou (CN); Xiaofeng Cui, Zhengzhou (CN); Songlin Du, Zhengzhou (CN); Wei Wei, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 66 days.

(21) Appl. No.: 18/719,142

(22) PCT Filed: Mar. 9, 2023

(86) PCT No.: PCT/CN2023/080392

§ 371 (c)(1),
(2) Date: Jun. 12, 2024

(87) PCT Pub. No.: WO2023/169492

PCT Pub. Date: Sep. 14, 2023

(65) Prior Publication Data

US 2025/0066960 A1     Feb. 27, 2025

(30) Foreign Application Priority Data

Mar. 11, 2022     (CN) ........................ 202210239068.X

(51) Int. Cl.
B32B 37/10 (2006.01)
D04H 1/4242 (2012.01)
(Continued)

(52) U.S. Cl.
CPC ....... D04H 1/4242 (2013.01); B32B 37/1018 (2013.01); D04H 1/587 (2013.01);
(Continued)

(58) Field of Classification Search
CPC ................ H05B 3/145; D10B 2401/18; D10B 2101/12; B32B 2457/00; B32B 2375/00;
(Continued)

(56) References Cited

FOREIGN PATENT DOCUMENTS

| CN | 2899365 Y | 5/2007 |
| CN | 105178090 A | 12/2015 |

(Continued)

OTHER PUBLICATIONS

Machine translation of CN 111278177 A (Year: 2020).*

(Continued)

*Primary Examiner* — Vishal I Patel
(74) *Attorney, Agent, or Firm* — Gavrilovich, Dodd & Lindsey LLP

(57) ABSTRACT

Provided is a method for preparing an electrothermal heating sheet from carbon fiber braided fabric scraps, including: cutting clumps of disordered carbon fiber braided fabric scraps into chopped carbon fibers; washing the chopped carbon fibers by separately using acetone and deionized water, and drying; preparing a corresponding dispersion; adding the chopped carbon fibers to the dispersion, and fully dispersing; performing vacuum filtration by using a double-layer metal screen, and drying to obtain a chopped carbon fiber felt; cutting the chopped carbon fiber felt, sticking electrodes to two ends of the chopped carbon fiber felt, and covering thermoplastic polyurethane (TPU) sheets on front and back surfaces of the chopped carbon fiber felt to form a heating sheet product having electrothermal performance and electromagnetic shielding performance.

8 Claims, 5 Drawing Sheets

(51) Int. Cl.
   *D04H 1/587* (2012.01)
   *D04H 1/645* (2012.01)
   *H05B 3/14* (2006.01)

(52) U.S. Cl.
   CPC .......... *D04H 1/645* (2013.01); *B32B 2305/20*
   (2013.01); *B32B 2305/70* (2013.01); *B32B*
   *2313/04* (2013.01); *B32B 2375/00* (2013.01);
   *B32B 2457/00* (2013.01); *D10B 2101/12*
   (2013.01); *D10B 2401/18* (2013.01); *H05B*
   *3/145* (2013.01)

(58) Field of Classification Search
   CPC ............ B32B 2313/04; B32B 2305/70; B32B
   2305/20; B32B 37/1018; D04H 1/645;
   D04H 1/587; D04H 1/4242
   See application file for complete search history.

(56) References Cited

FOREIGN PATENT DOCUMENTS

| CN | 106671502 A | 5/2017 |
|----|-------------|--------|
| CN | 109809829 A | 5/2019 |
| CN | 111278177 A | 6/2020 |
| CN | 113416327 A | 9/2021 |
| CN | 114567941 A | 5/2022 |
| JP | H07147183 A | 6/1995 |
| JP | H09260034 A | 10/1997 |

OTHER PUBLICATIONS

International Search Report and Written Opinion, PCT/CN2023/080392, International Searching Authority, China National Intellectual Property Administration, Apr. 12, 2023.
Office Action, China National Intellectual Property Administration, 202210239068.X, May 31, 2023.

* cited by examiner

METHOD FOR PREPARING ELECTROTHERMAL HEATING SHEET FROM CARBON FIBER BRAIDED FABRIC SCRAPS

CROSS REFERENCE TO RELATED APPLICATIONS

This patent application is a national stage application of International Patent Application No. PCT/CN2023/080392, filed on Mar. 9, 2023, which claims the benefit and priority of Chinese Patent Application No. CN202210239068.X, entitled "METHOD FOR PREPARING ELECTROTHERMAL HEATING SHEET FROM CARBON FIBER BRAIDED FABRIC SCRAPS", filed with the China National Intellectual Property Administration on Mar. 11, 2022, the disclosures of which are incorporated by reference herein in their entirety as part of the present application.

TECHNICAL FIELD

The present disclosure relates to reutilization of carbon fiber braided fabric scraps, and in particular, to a method for preparing an electrothermal heating sheet from carbon fiber braided fabric scraps.

BACKGROUND

Traditional electrothermal materials have a prevalent problem of high energy consumption, which greatly limits their use. Therefore, it is a current research hotspot to seek for an energy efficient electrothermal material in the field of materials. Carbon fibers have a broad prospect of application in the field of composite material-based electrothermal devices for their characteristics of low resistivity, high thermal conductivity, and the like.

The carbon fibers have high specific strength and specific modulus, and also advantages such as low density, no creep, low thermal expansion coefficient, good electrical conductivity, excellent electromagnetic shielding performance, strong corrosion resistance, and harmlessness to humans and animals, which could be widely used as reinforcements for composite materials.

However, the carbon fibers used in carbon fiber reinforced composite materials in engineering application has high cost and the price thereof is rising year after year, seriously affecting the promotion and use of the carbon fibers in the composite materials.

Carbon fiber braided fabric scraps are generated from braiding of carbon fiber tows or cutting before laying in a mold. Such scraps are not immersed in a resin and not recovered carbon fibers, and therefore, the properties of the scraps are not affected by acid-base recovery solutions or high temperatures. Reutilization of the scraps is an important measure for sustainable application of advanced composite materials and complies with the wish of national economic development for "green".

However, there are many problems in the reutilization of the carbon fiber braided fabric scraps. For example, it is hard to realize uniform dispersion of chopped carbon fibers, resulting in great discreteness of the electromagnetic shielding performance and electrical conductivity of carbon fiber reinforced composite materials. Therefore, solving the uniform dispersion problem of the carbon fibers is the key to the reutilization of the carbon fiber braided fabric scraps.

In addition, with the progress of modern science and technology, requirements on high-speed running of electronic devices make electronic parts and components develop towards light weight, microminiaturization, and integration. Electromagnetic interference (EMI) produced by different electronic devices during running will have a negative influence on the performance of electronic systems, and exposure to electromagnetic radiation for a long time will also harm human health. Therefore, suppressing or retarding bad EMI has become an important research direction in the field of material science. A radiant frequency of an electronic device for civil use is usually below 15 GHz, and a radiant frequency of an electronic device for military use is usually between 8 GHz and 18 GHz. From the perspective of absorbing electromagnetic wave, when a material has a reflectivity of lower than −5 dB, the material may be used in electromagnetic shielding of ordinary civil buildings; and when a material has a reflectivity of lower than −7 dB, the material may be used in electromagnetic shielding of military facilities; and when a material has a reflectivity of lower than −10 dB, the material is a good wave-absorbing material. Therefore, the electromagnetic shielding performance is another important problem that needs to be considered in the reutilization of the carbon fiber braided fabric scraps.

To solve the above problems, people have been looking for an ideal technical solution.

SUMMARY

An object of the present disclosure is to, in view of the shortcomings of the prior art, provide a method for preparing an electrothermal heating sheet from carbon fiber braided fabric scraps, which has the advantages of excellent electrical conductivity, good electromagnetic shielding performance, and high utilization ratio of carbon fiber braided fabric scraps.

To achieve the above object, the present disclosure provides the following technical solutions.

Provided is a method for preparing a carbon fiber felt from carbon fiber braided fabric scraps and sticking electrodes, including the following steps:

step 1) trimming: cutting clumps of disordered carbon fiber braided fabric scraps with a cutting length controlled to be 5 mm to 10 mm to obtain chopped carbon fibers;

step 2) standing: adding the chopped carbon fibers into a beaker containing acetone, and standing the chopped carbon fibers in a ventilation environment for 10 h to 14 h;

step 3) washing and drying: repeatedly washing the chopped carbon fibers after the standing by separately using acetone and deionized water, and drying in a drying oven to obtain dried chopped carbon fibers;

step 4) preparation of a dispersion: adding deionized water and absolute ethyl alcohol into two containers, respectively; dispersing a sodium carboxymethyl cellulose powder in the absolute ethyl alcohol, where a ratio of the sodium carboxymethyl cellulose powder to the absolute ethyl alcohol is in a range of 1 g:10-13 mL, and a volume ratio of the deionized water to the absolute ethyl alcohol is in a range of 8:1 to 10:1; and fully mixing the absolute ethyl alcohol dispersed with the sodium carboxymethyl cellulose powder with the deionized water to form the dispersion;

step 5) preparation of a chopped carbon fiber dispersion: adding 1 g to 2 g of the dried chopped carbon fibers obtained in step 3) into the dispersion and fully stirring to make the dried chopped carbon fibers be fully dispersed in the dispersion to form the chopped carbon fiber dispersion;

step 6) formation of a chopped carbon fiber felt sheet: guiding the chopped carbon fiber dispersion into a Buchner funnel with a double-layer metal screen, fully stirring and standing for 10 min, and turning on a vacuum filtration device and performing vacuum filtration to obtain the chopped carbon fiber felt sheet, where a gram weight of the chopped carbon fiber felt sheet is in a range of 10 g/m² and 80 g/m²;

step 7) drying: taking down an upper metal screen with the chopped carbon fiber felt sheet, and drying in a drying oven to obtain a circular chopped carbon fiber felt, and cutting the circular chopped carbon fiber felt to obtain a cut chopped carbon fiber felt; and step 8) making of electrodes: sticking electrodes to two ends of the cut chopped carbon fiber felt by uniformly coating a silver conductive adhesive onto the electrodes and sticking to the two ends of the cut chopped carbon fiber felt, and then drying a resulting chopped carbon fiber felt in a drying oven to obtain a carbon fiber felt sheet with the electrodes.

Also provided is a method for preparing an electrothermal heating sheet from carbon fiber braided fabric scraps, including the following steps:

step 1) trimming: cutting clumps of disordered carbon fiber braided fabric scraps with a cutting length controlled to be 5 mm to 10 mm to obtain chopped carbon fibers;

step 2) standing: adding the chopped carbon fibers into a beaker containing acetone and standing the chopped carbon fibers in a ventilation environment for 10 h to 14 h;

step 3) washing and drying: repeatedly washing the chopped carbon fibers after the standing by separately using acetone and deionized water, and drying in a drying oven to obtain dried chopped carbon fibers;

step 4) preparation of a dispersion: adding deionized water and absolute ethyl alcohol into two containers, respectively; dispersing a sodium carboxymethyl cellulose powder in the absolute ethyl alcohol, where a ratio of the sodium carboxymethyl cellulose powder to the absolute ethyl alcohol is in a range of 1 g:10-13 mL, and a volume ratio of the deionized water to the absolute ethyl alcohol is in a range of 8:1 to 10:1; and fully mixing the absolute ethyl alcohol dispersed with the sodium carboxymethyl cellulose powder with the deionized water to form the dispersion;

step 5) preparation of a chopped carbon fiber dispersion: adding 1 g to 2 g of the dried chopped carbon fibers obtained in step 3) into the dispersion and fully stirring to make the dried chopped carbon fibers be fully dispersed in the dispersion to form the chopped carbon fiber dispersion;

step 6) formation of a chopped carbon fiber felt sheet: guiding the chopped carbon fiber dispersion into a Buchner funnel with a double-layer metal screen, fully stirring and standing for 10 min, and turning on a vacuum filtration device and performing vacuum filtration to obtain the chopped carbon fiber felt sheet, where a gram weight of the chopped carbon fiber felt sheet is in a range of 10 g/m² and 80 g/m²;

step 7) drying: taking down an upper metal screen with the chopped carbon fiber felt sheet, and drying the upper metal screen with the chopped carbon fiber felt sheet in a drying oven to obtain a circular chopped carbon fiber felt, and cutting the circular chopped carbon fiber felt to obtain a cut chopped carbon fiber felt;

step 8) making of electrodes: sticking electrodes to two ends of the cut chopped carbon fiber felt by uniformly coating a silver conductive adhesive onto the electrodes and sticking to the two ends of the chopped carbon fiber felt, and then drying a resulting chopped carbon fiber felt in a drying oven to obtain a carbon fiber felt sheet with the electrodes;

step 9) preparation of a thermoplastic polyurethane (TPU) sheet: drying TPU particles in a drying oven to remove moisture to obtain dried TPU particles, and then preparing the dried TPU particles into a TPU sheet by using a vacuum laminator, where a thickness of the TPU sheet is controlled to be 0.1 mm to 2 mm; and step 10) forming of a product: sandwiching one layer of the chopped carbon fiber felt with the electrodes between two layers of the TPU sheet, and subjecting a resulting system to plastic packaging by a vacuum laminator to obtain a carbon fiber electrothermal heating sheet.

In some embodiments, in step 3), the drying in the drying oven is performed at a temperature of 60° C. for 1 h.

In some embodiments, in step 4), the deionized water is in an amount of 420 mL to 460 mL, the absolute ethyl alcohol is in an amount of 42 mL to 50 mL, and the sodium carboxymethyl cellulose powder is in an amount of 3 g to 5 g; and the mixing is performed under mechanical stirring at a rotation speed of 300 rpm for 3 h to dissolve sodium carboxymethyl cellulose, the deionized water, and the absolute ethyl alcohol to obtain the dispersion in which the sodium carboxymethyl cellulose is fully dissolved.

In some embodiments, in step 5), the chopped carbon fibers are added into the dispersion and stirred with a mechanical stirring device at a rotation speed of 300 rpm for 1 h.

In some embodiments, in step 7), the drying in the drying oven is performed at a temperature of 60° C. for 3 h; the circular chopped carbon fiber felt has a diameter of 90 mm; and the circular chopped carbon fiber felt is cut to obtain a felt sheet.

In some embodiments, in step 7), the felt sheet has a size of 50 mm×50 mm.

In some embodiments, in step 8), the electrode is a red copper electrode; and the drying in the drying oven is performed at a temperature of 60° C. for 30 min.

In some embodiments, in step 9), the moisture is removed from the TPU particles at a temperature of 60° C. for 10 h; and the vacuum laminator is at a temperature of 210° C. and under a pressure of 4 MPa.

The present disclosure has prominent substantive features and notable progress as compared with prior arts. Specifically, in the present disclosure, the carbon fiber braided fabric scraps are cut into the chopped carbon fibers having a relatively uniform length. On the one hand, a good electromagnetic shielding basis is laid; and on the other hand, the problems of agglomeration and difficult dispersion in the carbon fiber dispersion process could be solved. The chopped carbon fibers are then washed, which is mainly intended to remove a pulp on the surface of the carbon fibers to fully expose the carbon fibers and strengthen connection between the chopped carbon fibers. Subsequently, the dispersion is prepared to disperse the carbon fibers. Then, the dispersion is dried, and a resulting material is cut, and electrodes are added to two ends thereof, and TPU sheets are used for plastic packaging; thus, the preparation of the electrothermal heating sheet is completed.

DETAILED DESCRIPTION OF THE EMBODIMENTS

Figure 1:
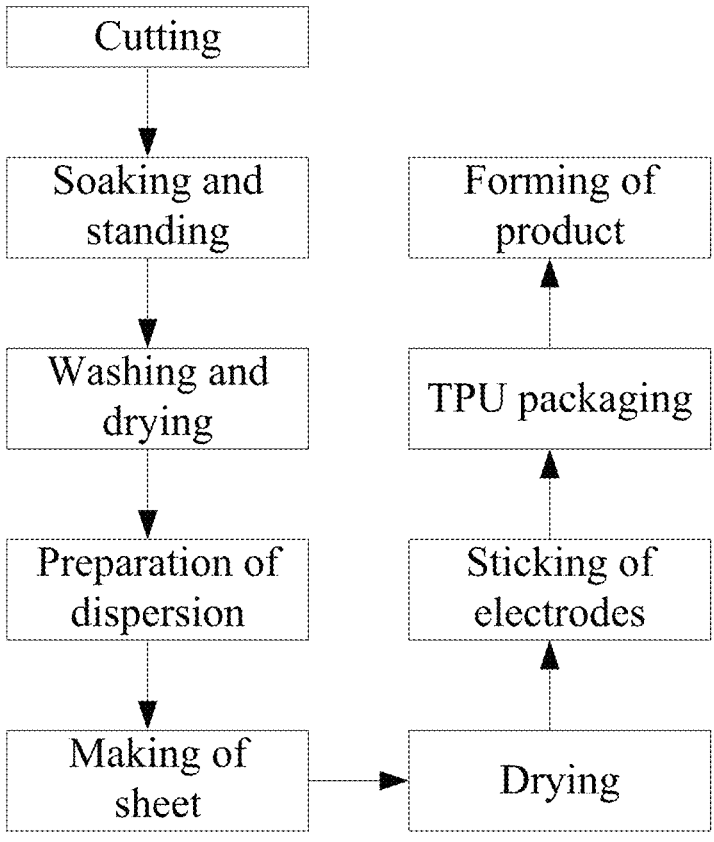
FIG. 1 shows a flowchart of a method for preparing an electrothermal heating sheet from carbon fiber braided fabric scraps according to an embodiment of the present disclosure.

As shown in FIG. 1, a method for preparing an electrothermal heating sheet from carbon fiber braided fabric scraps includes the following steps.

Figure 2:
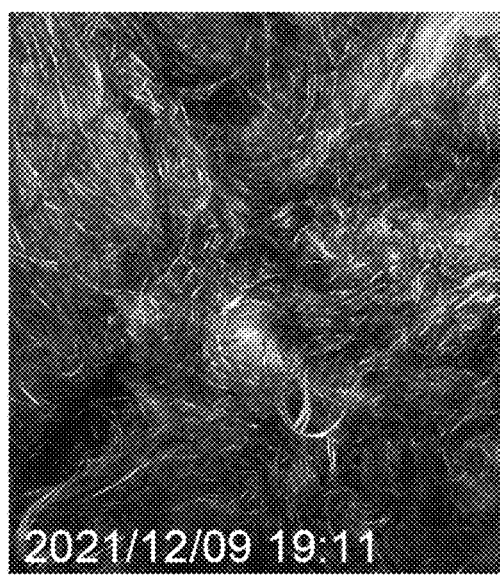
FIG. 2 shows a diagram illustrating a comparison of samples of carbon fiber braided fabric scraps in cutting, soaking, drying, and sheet forming processes according to an embodiment of the present disclosure.
Figure 2:
Figure 2:
Figure 2:
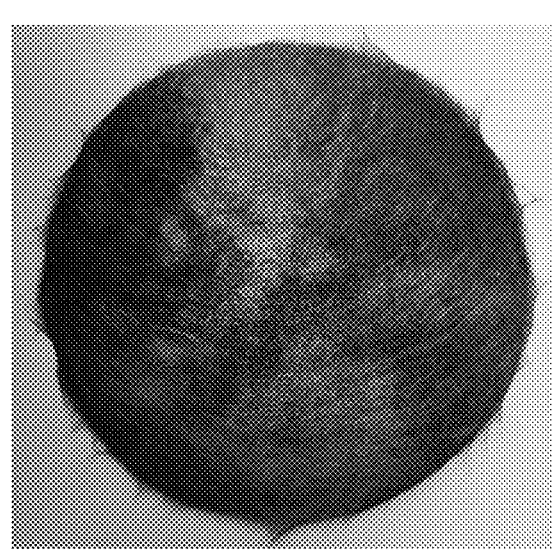

Step 1) trimming: clumps of disordered carbon fiber braided fabric scraps are cut with a cutting length controlled to be 5 mm to 10 mm to form chopped carbon fibers. This mainly has two purposes: the first one is to facilitate the subsequent dispersion process of the carbon fibers, avoiding the problem that the clumps of carbon fibers cannot be treated; and the second one is to improve the electromagnetic shielding performance of the carbon fibers. The chopped carbon fibers have excellent electromagnetic shielding performance when the length thereof is within a reasonable range. In FIG. 2, the upper left image shows the clumps of disordered carbon fiber braided fabric scraps.

Step 2) standing: the chopped carbon fibers are added into a beaker containing acetone and stood in a ventilation environment for 10 h to 14 h, in a state as shown in the upper right image in FIG. 2.

Step 3) washing and drying: the chopped carbon fibers after the standing are washed repeatedly by separately using acetone and deionized water, and dried in a drying oven at a temperature of 60° C. for 1 h. This step is mainly to wash off a pulp on the surface of the carbon fibers.

Step 4) preparation of a dispersion: deionized water and absolute ethyl alcohol are added into two containers, respectively, and then a sodium carboxymethyl cellulose powder is dispersed in the absolute ethyl alcohol. Where, a volume ratio of the deionized water to the absolute ethyl alcohol is in a range of 8:1 to 10:1, and a ratio of the sodium carboxymethyl cellulose powder to the absolute ethyl alcohol is in a range of 1 g:10-13 mL. The ratio is controlled in the above range, which could prevent flocculation and not easy dissolution of the sodium carboxymethyl cellulose when added to the deionized water. Specifically, the deionized water is in an amount of 420 mL to 460 mL, the absolute ethyl alcohol is in an amount of 42 mL to 50 mL, and the sodium carboxymethyl cellulose powder is in an amount of 3 g to 5 g. The absolute ethyl alcohol dispersed with the sodium carboxymethyl cellulose is fully mixed with the deionized water, and dissolved by mechanical stirring at a rotation speed of 300 rpm for 3 h, to obtain the dispersion in which the sodium carboxymethyl cellulose is fully dissolved.

Step 5) preparation of a chopped carbon fiber dispersion: 1 g to 2 g of the chopped carbon fibers is added into the dispersion and fully stirred by using a mechanical stirring device at a rotation speed of 300 rpm for 1 h to make the chopped carbon fibers be fully dispersed in the dispersion to form the chopped carbon fiber dispersion, as shown in the left lower image in FIG. 2.

Step 6) formation of a chopped carbon fiber felt sheet: the chopped carbon fiber dispersion is guided into a Buchner funnel with a double-layer metal screen, fully stirred, and stood for 10 min. Then, a vacuum filtration device is turned on and vacuum filtration is performed to obtain the chopped carbon fiber felt sheet, where a gram weight of chopped carbon fiber felt sheet is in a range of 10 $g/m^2$ and 80 $g/m^2$, as shown in the right lower image in FIG. 2.

Step 7) drying: an upper metal screen with the chopped carbon fiber felt sheet is taken down and dried in a drying oven at a temperature of 60° C. for 3 h to obtain a circular chopped carbon fiber felt with a diameter of 90 mm, and the circular chopped carbon fiber felt is cut to obtain a cut chopped carbon fiber felt with a size of 50 mm×50 mm.

step 8) making of electrodes: red copper electrodes are used and stuck on two ends of the cut chopped carbon fiber felt by uniformly coating a silver conductive adhesive onto the electrodes and sticking to the two ends of the chopped carbon fiber felt, and then putting a resulting chopped carbon fiber felt in a drying oven for drying, where the electrode has a size of 80 mm×5 mm×0.02 mm. The silver conductive adhesive is uniformly coated onto the electrodes, and the electrodes are stuck on the two ends of the chopped carbon fiber felt, and a resulting chopped carbon fiber felt is put in a drying oven at 60° C. for 30 min such that the silver conductive adhesive is fully dried, thereby guaranteeing that the electrodes are bonded to the chopped carbon fiber felt more firmly.

Step 9) preparation of a TPU sheet: TPU (thermoplastic polyurethane, 1185A, polyether type) particles are put into a drying oven at 60° C. for 10 h to completely remove moisture in the TPU to obtain dried TPU particles. The dried TPU particles are prepared into a TPU sheet by using a vacuum laminator at a temperature of 210° C. and under a pressure of 4 MPa for later use, where the TPU sheet has a thickness controlled to e 0.1 mm to 2 mm.

Figure 3:
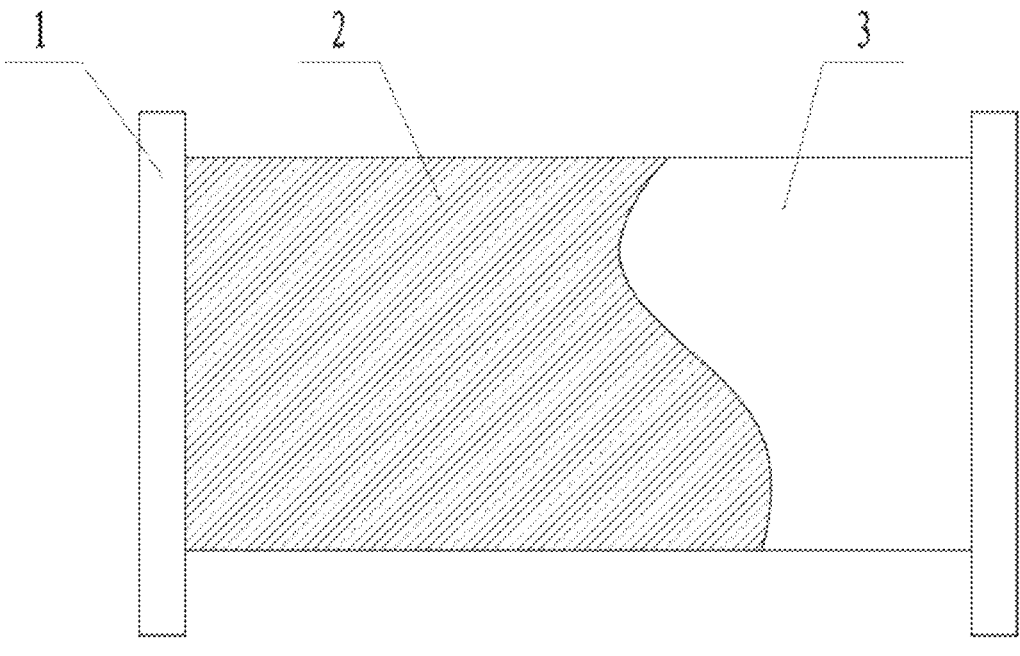
FIG. 3 shows a structural schematic diagram of an electrothermal heating sheet according to an embodiment of the present disclosure.

Step 10) forming of a product: one layer of the chopped carbon fiber felt with the electrodes is sandwiched between two layers of the TPU sheets, and a resulting system is plastic packaged by a vacuum laminator to obtain a product, as shown in FIG. 3, where 1 represents the electrode, 2 represents the chopped carbon fiber felt, and 3 represents the TPU sheet.

Figure 4:
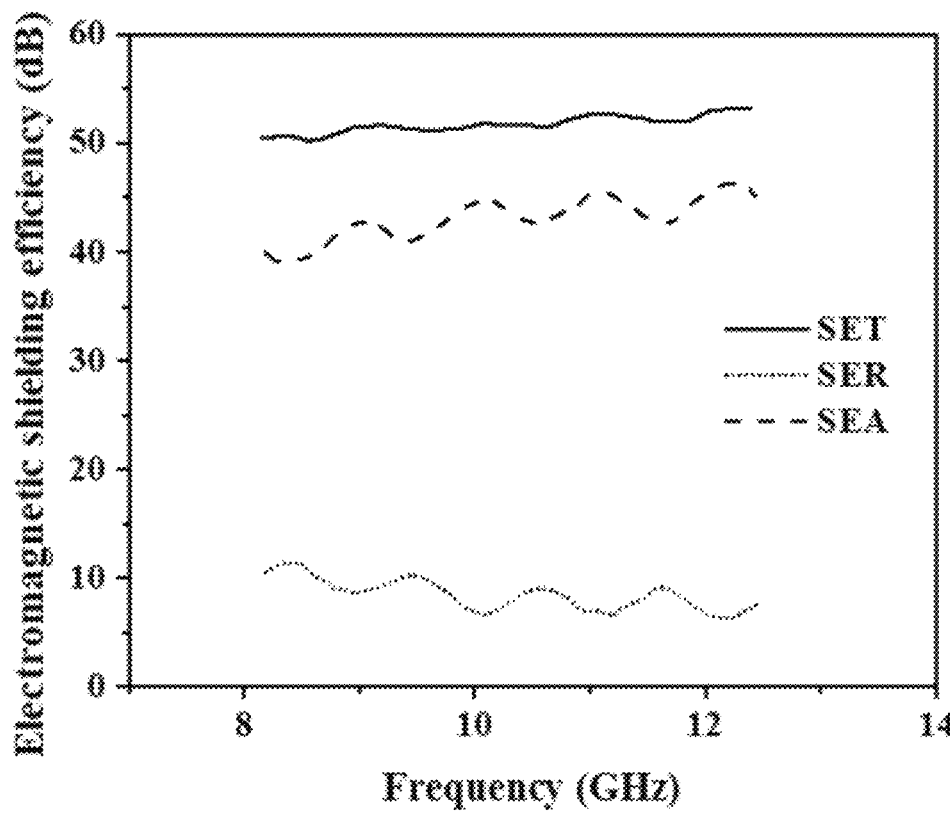
FIG. 4 shows a schematic diagram of an electromagnetic shielding efficiency of an electrothermal heating sheet according to an embodiment of the present disclosure.

As shown in FIG. 4, a data diagram of an electromagnetic shielding efficiency experiment conducted on the product is illustrated.

Figure 5:
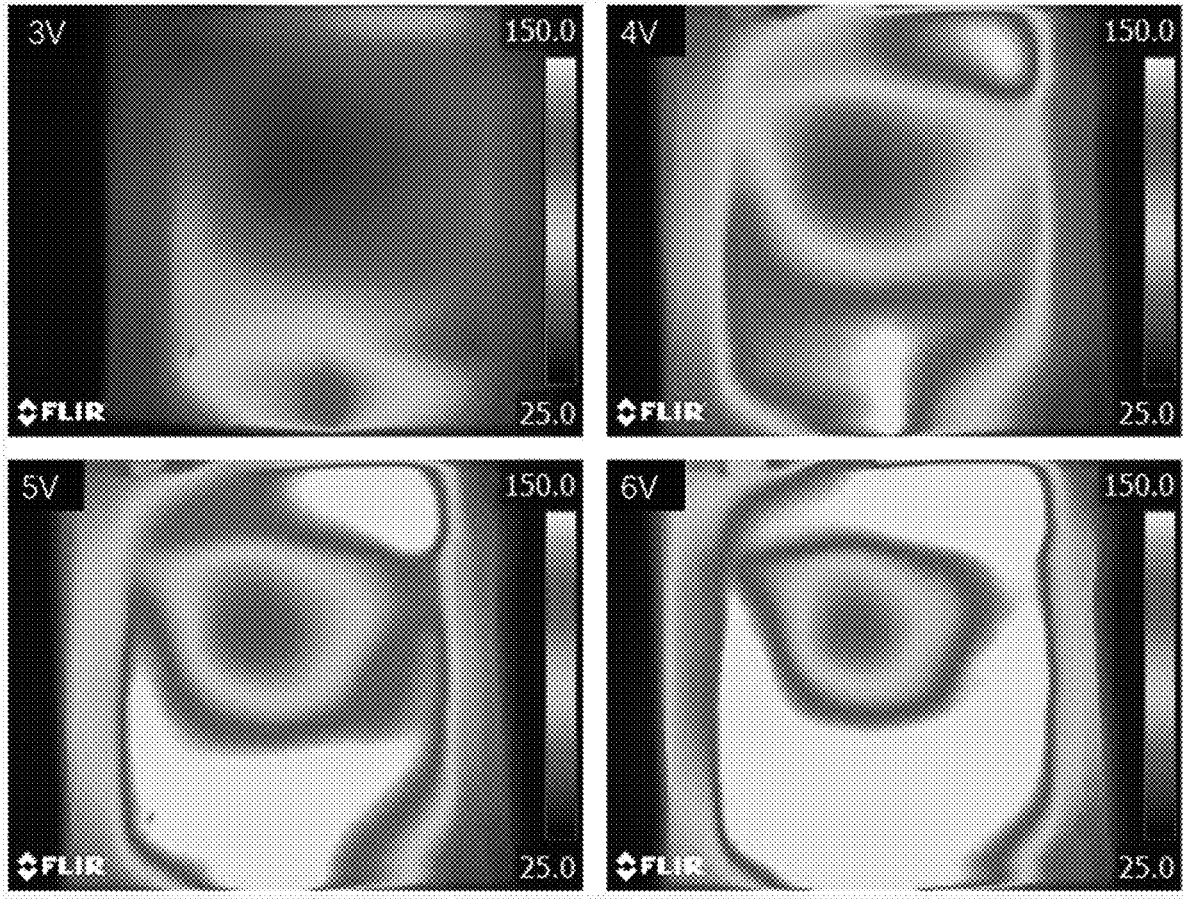
FIG. 5 shows a diagram of a heat profile of an electrothermal heating sheet according to an embodiment of the present disclosure.

As shown in FIG. 5, a diagram of heat profiles of the product which is electrified and heated under 3 V, 4 V, 5 V, and 6 V is illustrated.

Figure 6:
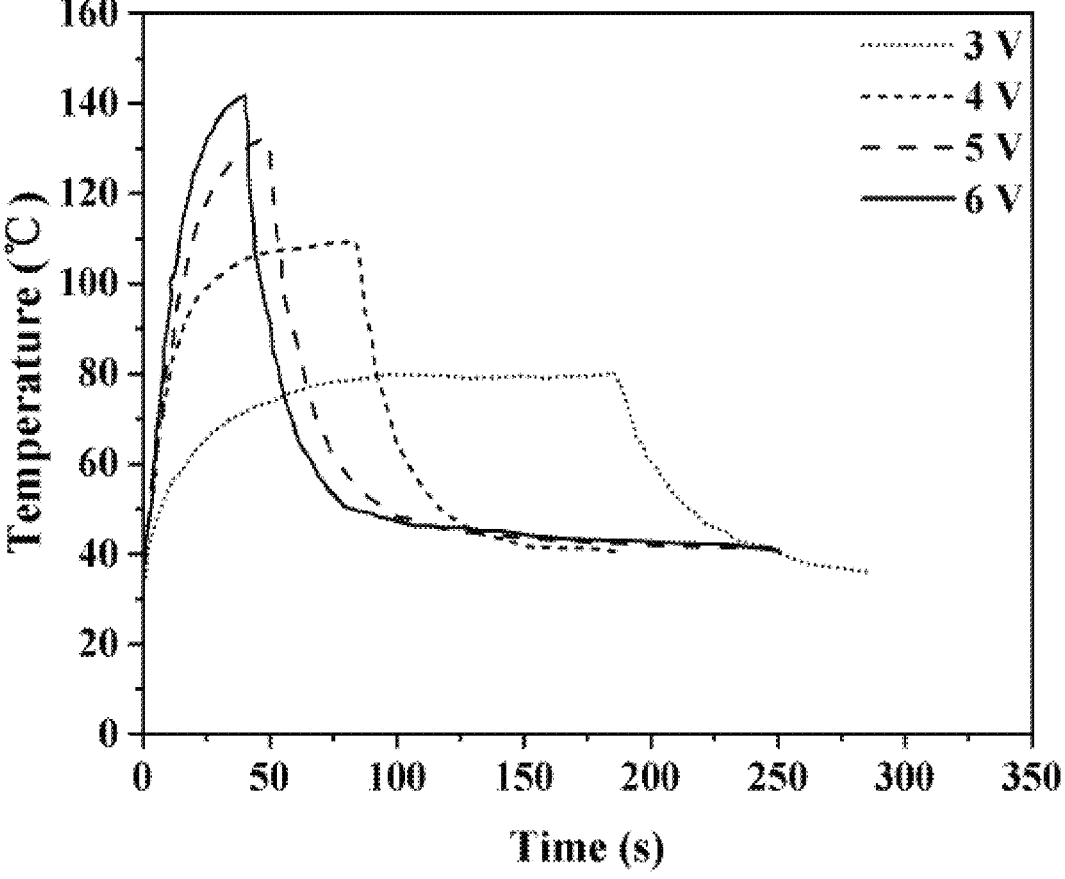
FIG. 6 shows a curve diagram of temperatures as a function of time under different voltages of an electrothermal heating sheet according to an embodiment of the present disclosure.

As shown in FIG. 6, a curve diagram of temperatures as a function of time when the product is electrified and heated under 3 V, 4 V, 5 V, and 6 V is illustrated.

The above described are merely preferred embodiments of the present disclosure rather than limitations to the present disclosure in any form. It should be noted that those skilled in the art may further make several improvements and modifications without departing from the principle of the present disclosure, but such improvements and modifications should be deemed as falling within the scope of the present disclosure.

What is claimed is:

1. A method for preparing an electrothermal heating sheet from carbon fiber braided fabric scraps, comprising the following steps:

step 1) trimming: cutting clumps of disordered carbon fiber braided fabric scraps with a cutting length controlled to be 5 mm to 10 mm to obtain chopped carbon fibers;

step 2) standing: adding the chopped carbon fibers into a beaker containing acetone and standing the chopped carbon fibers in a ventilation environment for 10 h to 14 h;

step 3) washing and drying: repeatedly washing the chopped carbon fibers after the standing by separately using acetone and deionized water, and drying in a drying oven to obtain dried chopped carbon fibers;

step 4) preparation of a dispersion: adding deionized water and absolute ethyl alcohol into two containers, respectively; dispersing a sodium carboxymethyl cellulose powder in the absolute ethyl alcohol, wherein a ratio of the sodium carboxymethyl cellulose powder to the absolute ethyl alcohol is in a range of 1 g:10-13 mL, and a volume ratio of the deionized water to the absolute ethyl alcohol is in a range of 8:1 to 10:1; and fully mixing the absolute ethyl alcohol dispersed with the sodium carboxymethyl cellulose powder with the deionized water to form the dispersion;

step 5) preparation of a chopped carbon fiber dispersion: adding 1 g to 2 g of the dried chopped carbon fibers obtained in step 3) into the dispersion and fully stirring to make the dried chopped carbon fibers be fully dispersed in the dispersion to form the chopped carbon fiber dispersion;

step 6) formation of a chopped carbon fiber felt sheet: guiding the chopped carbon fiber dispersion into a Buchner funnel with a double-layer metal screen, fully stirring and standing for 10 min, and turning on a vacuum filtration device and performing vacuum filtration to obtain the chopped carbon fiber felt sheet, wherein a gram weight of the chopped carbon fiber felt sheet is in a range of 10 g/m² and 80 g/m²;

step 7) drying: taking down an upper metal screen with the chopped carbon fiber felt sheet, and drying in a drying oven to obtain a circular chopped carbon fiber felt, and cutting the circular chopped carbon fiber felt to obtain a cut chopped carbon fiber felt;

step 8) making of electrodes: sticking electrodes to two ends of the cut chopped carbon fiber felt by uniformly coating a silver conductive adhesive onto the electrodes and sticking to the two ends of the chopped carbon fiber felt, and then drying a resulting chopped carbon fiber felt in a drying oven to obtain a carbon fiber felt sheet with the electrodes;

step 9) preparation of a thermoplastic polyurethane (TPU) sheet: drying TPU particles in a drying oven to remove moisture to obtain dried TPU particles, and then preparing the dried TPU particles into a TPU sheet by using a vacuum laminator, wherein a thickness of the TPU sheet is controlled to be 0.1 mm to 2 mm; and step 10) forming of a product: sandwiching one layer of the chopped carbon fiber felt with the electrodes between two layers of the TPU sheet, and subjecting a resulting system to plastic packaging by a vacuum laminator to obtain the electrothermal heating sheet.

2. The method for preparing the electrothermal heating sheet from the carbon fiber braided fabric scraps of claim 1, wherein in step 3), the drying in the drying oven is performed at a temperature of 60° C. for 1 h.

3. The method for preparing the electrothermal heating sheet from the carbon fiber braided fabric scraps of claim 2, wherein in step 4), the deionized water is in an amount of 420 mL to 460 mL, the absolute ethyl alcohol is in an amount of 42 mL to 50 mL, and the sodium carboxymethyl cellulose powder is in an amount of 3 g to 5 g; and the mixing is performed under mechanical stirring at a rotation speed of 300 rpm for 3 h to dissolve sodium carboxymethyl cellulose, the deionized water, and the absolute ethyl alcohol to obtain the dispersion in which the sodium carboxymethyl cellulose is fully dissolved.

4. The method for preparing the electrothermal heating sheet from the carbon fiber braided fabric scraps of claim 2, wherein in step 5), the chopped carbon fibers are added into the dispersion and stirred with a mechanical stirring device at a rotation speed of 300 rpm for 1 h.

5. The method for preparing the electrothermal heating sheet from the carbon fiber braided fabric scraps of claim 4, wherein in step 7), the drying in the drying oven is performed at a temperature of 60° C. for 3 h; the circular chopped carbon fiber felt has a diameter of 90 mm; and circular chopped carbon fiber felt is cut to obtain a felt sheet.

6. The method for preparing the electrothermal heating sheet from the carbon fiber braided fabric scraps of claim 5, wherein in step 7), the felt sheet has a size of 50 mm×50 mm.

7. The method for preparing the electrothermal heating sheet from the carbon fiber braided fabric scraps of claim 5, wherein in step 8), the electrode is a red copper electrode; and the drying in the drying oven is performed at a temperature of 60° C. for 30 min.

8. The method for preparing the electrothermal heating sheet from the carbon fiber braided fabric scraps of claim 7, wherein in step 9), the moisture is removed from the TPU particles at a temperature of 60° C. for 10 h; and the vacuum laminator is at a temperature of 210° C. and under a pressure of 4 MPa.

* * * * *